(12) United States Patent
Nakashima et al.

(10) Patent No.: US 7,008,023 B2
(45) Date of Patent: Mar. 7, 2006

(54) HYDRAULIC BRAKE APPARATUS

(75) Inventors: Nobuyuki Nakashima, Chiryu (JP); Atsushi Yasuda, Toyoake (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/733,334

(22) Filed: Dec. 12, 2003

(65) Prior Publication Data

US 2004/0124698 A1    Jul. 1, 2004

(30) Foreign Application Priority Data

Dec. 25, 2002    (JP)    ............................ 2002-374048

(51) Int. Cl.
*B60T 8/44*    (2006.01)
(52) U.S. Cl. ...................... 303/114.1; 60/562; 188/358
(58) Field of Classification Search ........ 188/345–360; 303/114.1; 60/547.1–589
See application file for complete search history.

(56) References Cited

U.S. PATENT DOCUMENTS

| | | | | |
|---|---|---|---|---|
| 4,340,257 A | * | 7/1982 | Belart | 303/114.1 |
| 4,416,491 A | * | 11/1983 | Belart et al. | 303/114.1 |
| 4,453,380 A | * | 6/1984 | Meynier | 60/534 |
| 4,708,404 A | * | 11/1987 | Seibert et al. | 303/114.1 |
| 4,730,877 A | * | 3/1988 | Seibert et al. | 303/52 |
| 6,058,705 A | * | 5/2000 | Schunck | 60/562 |
| 6,729,698 B1 | * | 5/2004 | Kusano et al. | 303/191 |
| 6,775,979 B1 | * | 8/2004 | Drott et al. | 60/588 |
| 2002/0101114 A1 | * | 8/2002 | Kamiya et al. | 303/114.1 |

FOREIGN PATENT DOCUMENTS

| | | |
|---|---|---|
| DE | 35 02 018 | 7/1986 |
| JP | 10-167042 | 6/1998 |

* cited by examiner

*Primary Examiner*—Chris Schwartz
(74) *Attorney, Agent, or Firm*—Buchanan Ingersoll PC

(57) ABSTRACT

A hydraulic brake apparatus includes a brake master cylinder having a rod piston moving in response to a brake pedal; a separation valve provided in a hydraulic brake circuit in order to establish and shut off communication between the brake master cylinder and the brake wheel cylinders; a pressure control valve unit for controlling fluid pressure to be supplied from an external fluid-pressure supply source to the brake wheel cylinders while the separation valve is in a shutoff condition; and a stroke simulator mechanism for allowing an idle stroke of the rod piston so as to ensure a stroke of the brake pedal in accordance with an input load to the brake pedal. An orifice is provided in a passage which establishes, during the idle stroke of the rod piston, communication between a pressure chamber and an atmospheric pressure chamber which are defined within the brake master cylinder by means of the rod piston.

1 Claim, 2 Drawing Sheets

HYDRAULIC BRAKE APPARATUS

BACKGROUND OF THE INVENTION

1. Field of the Invention

The present invention relates to a hydraulic brake apparatus for use as, for example, a brake apparatus of a vehicle.

2. Description of the Related Art

A conventional hydraulic brake apparatus includes a tandem brake master cylinder having a rod piston and a floating piston, the rod piston moving in response to a brake-operating member such as a brake pedal, and the floating piston moving in response to the rod piston; a separation valve provided in a hydraulic brake circuit connecting the brake master cylinder and a brake wheel cylinder, the separation valve being able to establish and shut off communication between the brake master cylinder and the brake wheel cylinder; a pressure control valve unit for controlling fluid pressure to be supplied to the brake wheel cylinder from an external fluid-pressure supply source while the separation valve is in a shutoff condition; and a stroke simulator mechanism for allowing an idle stroke of the rod piston and an idle stroke of the floating piston while the separation valve is in the shutoff condition (during an idle stroke, no pressure is generated in the brake master cylinder) so as to ensure a stroke of the brake-operating member in accordance with an input load to the brake-operating member (see, for example, Japanese Patent Application Laid-Open (kokai) No. 10-167042).

The hydraulic brake apparatus described in the above publication is set such that an idle stroke of the rod piston, which moves in response to the brake-operating member such as a brake pedal, and an idle stroke of the floating piston, which moves in response to the rod piston, can be performed sequentially and stepwise. However, during the idle strokes, an operator's feeling of operating the brake-operating member hardly changes even when operation speed changes. As a result, at the time of abrupt operation, sufficient rigid feel cannot be attained, and the operator's operation feeling may be impaired.

SUMMARY OF THE INVENTION

An object of the present invention is to solve the above-mentioned problems in the conventional hydraulic brake apparatus and to provide a hydraulic brake apparatus which can improve an operator's feeling of operating a brake-operating member when a rod piston moves rapidly due to an abrupt operation of the brake-operating member.

To achieve the above object, the present invention provides a hydraulic brake apparatus comprising a tandem brake master cylinder having a rod piston and a floating piston, the rod piston moving in response to a brake-operating member, and the floating piston moving in response to the rod piston; a separation valve provided in a hydraulic brake circuit connecting the brake master cylinder and a brake wheel cylinder, the separation valve being able to establish and shut off communication between the brake master cylinder and the brake wheel cylinder; a pressure control valve unit for controlling fluid pressure to be supplied from an external fluid-pressure supply source to the brake wheel cylinder while the separation valve is in a shutoff condition; and a stroke simulator mechanism for allowing an idle stroke of the rod piston and an idle stroke of the floating piston, while the separation valve is in the shutoff condition, so as to ensure a stroke of the brake-operating member in accordance with an input load to the brake-operating member. In the hydraulic brake apparatus, an orifice is provided in a passage which establishes, during the idle stroke of the rod piston, communication between a pressure chamber and an atmospheric pressure chamber which are defined within the brake master cylinder by means of the rod piston.

Therefore, when the rod piston moves rapidly due to an abrupt operation of the brake-operating member, the orifice exhibits a throttle effect during the idle stroke of the rod piston, so that pressure is generated in the pressure chamber defined by means of the rod piston. The thus-generated pressure acts, as a reaction force, on the brake-operating member, to enhance the rigid feel, whereby the operation feeling at the time of abrupt operation of the brake-operating member can be improved.

In this case, preferably, the orifice exhibits a throttle effect until a relative movement between the rod piston and the floating piston substantially ends. In this case, a throttle effect can be obtained over the substantially entire idle stroke of the rod piston, whereby sufficiently high pressure is generated in the pressure chamber defined by the rod piston.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

Figure 1:
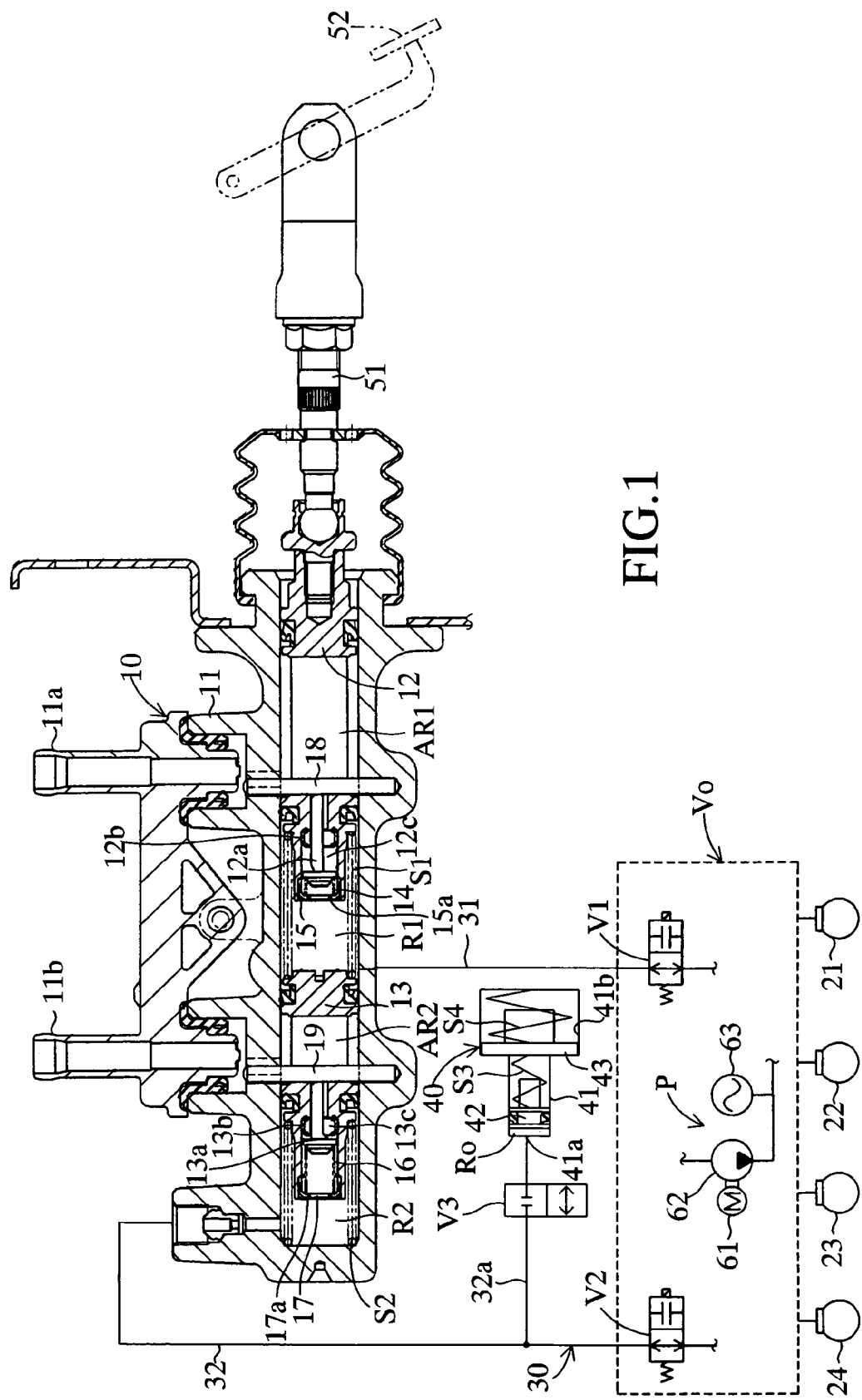
FIG. 1 is a schematic configuration view showing an embodiment of a hydraulic brake apparatus according to the present invention.

An embodiment of the present invention will next be described in detail with reference to the drawings. FIG. 1 schematically shows a hydraulic brake apparatus according to the embodiment. The hydraulic brake apparatus includes a tandem brake master cylinder 10; four brake wheel cylinders 21, 22, 23, and 24 for braking corresponding wheels; a two-system hydraulic brake circuit 30 (pipe lines 31 and 32) for connecting the brake master cylinder 10 and the brake wheel cylinders 21, 22, 23, and 24; a pair of separation valves V1 and V2; an external fluid-pressure supply source P; a pressure control valve unit Vo; an on-off valve V3; and a simulator cylinder 40.

The brake master cylinder 10 includes a cylinder body ii having ports 11a and 11b to be connected to a reservoir (not shown) for storing a brake fluid; and a rod piston 12 and a floating piston 13, which are incorporated into the cylinder body 11 in a fluid-tight and axially slidable manner. Thus, the brake master cylinder 10 has a first pressure chamber R1 and a second pressure chamber R2 formed therein. The first pressure chamber R1 accommodates a compression coil spring S1 having a setting load (mounting load in the basic condition illustrated in FIG. 1) f1; and the second pressure chamber R2 accommodates a compression coil spring S2 having a setting load f2 (f2>f1). Moreover, the brake master cylinder 10 has a first reservoir pressure chamber AR1 and a second reservoir pressure chamber AR2, which are always in communication with the reservoir. Notably, the rod piston 12 may be called a first piston, and the floating piston 13 may be called a second piston.

Figure 2:
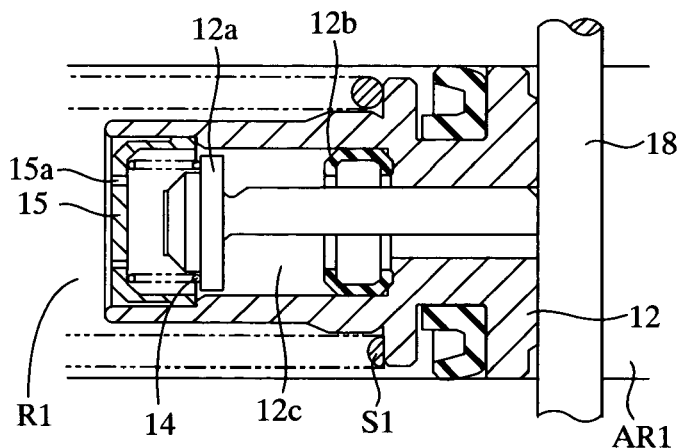
FIG. 2 is an enlarged cross section of a main portion of the hydraulic brake apparatus of FIG. 1.

As shown in FIGS. 1 and 2, the rod piston 12 defines within the cylinder body 11 the first reservoir pressure chamber AR1, which is always in communication with the reservoir, and the first pressure chamber R1, which can be connected to or separated from the first reservoir pressure chamber AR1. The rod piston 12 has an axial sliding resistance r1; is connected to a brake pedal 52, which serves as a brake-operating member, via a pedal rod 51; and can be mechanically pressed into the brake master cylinder 10 through an operator's stepping on the brake pedal 52. A plunger valve 12a is provided at a center portion of the rod piston 12. The plunger valve 12a opens and closes in accordance with a stroke; i.e., an axial movement, of the rod piston 12.

When the rod piston 12 is in the basic position illustrated in FIG. 1, the plunger valve 12a is in engagement with a rod 18 fixed to the cylinder body 11 and is separated from a valve seat 12b, so that the plunger valve 12a is open and establishes communication between the first pressure chamber R1 and the first reservoir pressure chamber AR1 via a passage 12c provided in the rod piston 12. The valve-opening stroke of the plunger valve 12a is set to about 6 mm. When the rod piston 12 moves from its illustrated basic position by about 6 mm or more, the plunger valve 12a is seated on the valve seat 12b and is closed, whereby the communication between the first pressure chamber R1 and the first reservoir pressure chamber AR1 is broken. Thus, an idle stroke of the rod piston 12, during which no pressure is generated in the first pressure chamber R1, is about 6 mm.

The floating piston 13 defines within the cylinder body lithe second reservoir pressure chamber AR2, which is always in communication with the reservoir, and the second pressure chamber R2, which can be connected to or separated from the second reservoir pressure chamber AR2. The floating piston 13 has an axial sliding resistance r2. The spring force of the compression coil spring S1 and fluid pressure in the first pressure chamber R1—which vary with movement of the rod piston 12—press and cause the floating piston 13 to move against the spring force of the compression coil spring S2, which intervenes between the floating piston 13 and the cylinder body 11, and against fluid pressure in the second pressure chamber R2. A plunger valve 13a is provided at a center portion of the floating piston 13. The plunger valve 13a opens and closes in accordance with a stroke; i.e., an axial movement, of the floating piston 13.

When the floating piston 13 is in the basic position illustrated in FIG. 1, the plunger valve 13a is in engagement with a rod 19 fixed to the cylinder body 11 and is separated from a valve seat 13b, so that the plunger valve 13a is open and establishes communication between the second pressure chamber R2 and the second reservoir pressure chamber AR2 via a passage 13c provided in the floating piston 13. The valve-opening stroke of the plunger valve 13a is set to about 1 mm. When the floating piston 13 moves from its illustrated basic position by about 1 mm or more, the plunger valve 13a is seated on the valve seat 13b and is closed, whereby the communication between the second pressure chamber R2 and the second reservoir pressure chamber AR2 is broken. Thus, an idle stroke of the rod piston 13, during which no pressure is generated in the second pressure chamber R2, is about 1 mm.

The plunger valve 13a is always urged toward the rod 19 by means of a return spring 16. The return spring 16 is interposed between the plunger valve 13a and a retainer cap 17 fixed to the floating piston 13. The retainer cap 17 has an orifice 17a, which exhibits a throttle effect, and is fluid-tightly fixed to the floating piston 13 via an outer periphery thereof. The orifice 17a exhibits a throttle effect until the plunger valve 13a is seated on the valve seat 13b and is closed.

The separation valve V1 is a normally-open, 2-port, 2-position on-off valve. The separation valve V1 is provided in the pipe line 31 of the hydraulic brake circuit 30, which line connects the first pressure chamber R1 of the brake master cylinder 10 and both brake wheel cylinders 21 and 22, and can establish and shut off communication through the pipe line 31. An electric control unit (not shown) controls the on-off operation of the separation valve V1. The separation valve V2 is a normally-open, 2-port, 2-position on-off valve. The separation valve V2 is provided in the pipe line 32 of the hydraulic brake circuit 30, which line connects the second pressure chamber R2 of the brake master cylinder 10 and both brake wheel cylinders 23 and 24, and can establish and shut off communication through the pipe line 32. The electric control unit (not shown) controls the on-off operation of the separation valve V2.

The external fluid-pressure supply source P can supply fluid pressure to the brake wheel cylinders 21, 22, 23, and 24 via the pressure control valve unit Vo when both separation valves V1 and V2 are in the shutoff condition. The external fluid-pressure supply source P includes an electric motor 61, whose operation is controlled by the electric control unit (not shown); a pump 62 to be driven by the electric motor 61; and an accumulator 63 for storing pressurized fluid that is discharged from the pump 62.

The pressure control valve unit Vo has various control valves (not shown) for individually controlling fluid pressure that is supplied to the brake wheel cylinders 21, 22, 23, and 24 from the external fluid-pressure supply source P when the separation valves V1 and V2 are in the shutoff condition. The electric control unit (not shown) controls operation of these control valves, whereby ordinary brake control, antiskid control, or traction control is performed.

The on-off valve V3 is a normally-closed, 2-port, 2-position on-off valve. The on-off valve V3 is provided in a branch pipe line 32a, which branches off from the pipe line 32 connecting the second pressure chamber R2 of the brake master cylinder 10 and both brake wheel cylinders 23 and 24, and connects the pipe line 32 and the simulator cylinder 40. The on-off valve V3 can establish and shut off communication through the branch pipe line 32a. The electric control unit (not shown) causes the on-off valve V3 to open when both separation valves V1 and V2 are in the shutoff condition.

Figure 3:
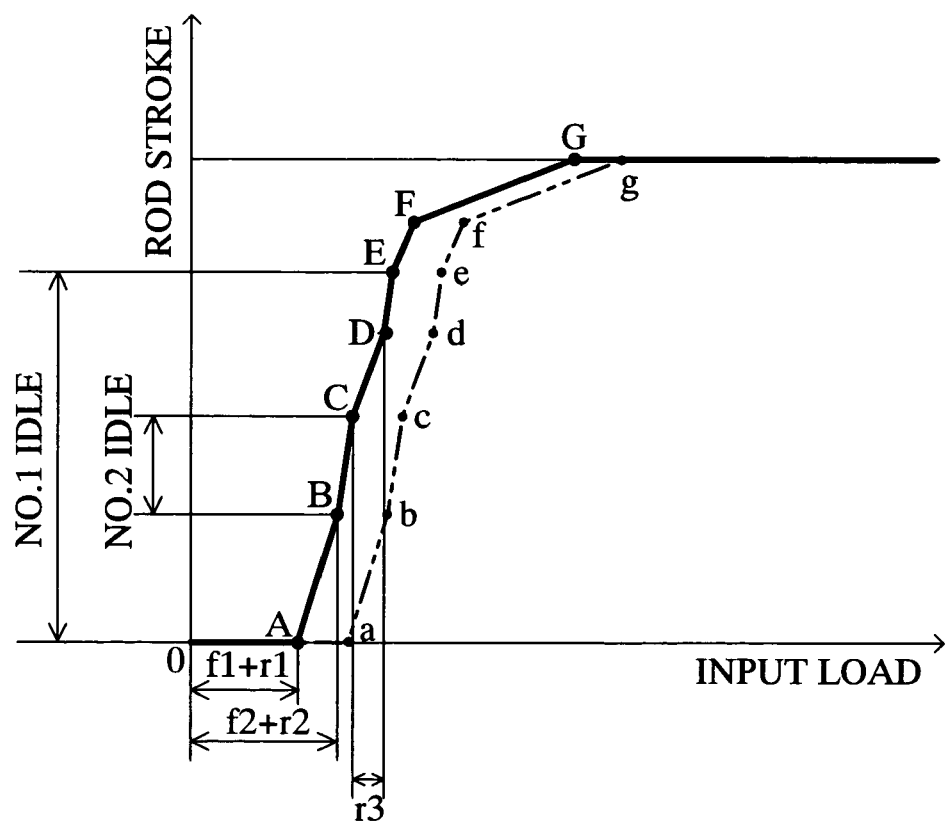
FIG. 3 is a diagram showing the relationship between input load and rod stroke during the course of operation of a stroke simulator mechanism of the hydraulic brake apparatus of FIG. 1.

The simulator cylinder 40, the compression coil springs S1 and S2 mounted in the brake master cylinder 10, and the on-off valve V3 provided in the branch line 32a constitute a stroke simulator mechanism. When both separation valves V1 and V2 are in the shutoff condition, and the on-off valve V3 is in the communication condition, the stroke simulator mechanism allows an idle stroke of the rod piston 12 and an idle stroke of the floating piston 13, thereby, as shown in FIG. 3, ensuring a stroke of the brake pedal 52 and a stroke of the pedal rod 51 (rod stroke) in accordance with an input load to the brake pedal 52.

The simulator cylinder 40 includes a cylinder body 41 having a port 41a and a stepped bore 41b, the port 41a communicating with the second pressure chamber R2 of the brake master cylinder 10 when the on-off valve V3 is open; a small-diameter piston 42, which is provided in a small-diameter portion of the stepped bore 41$b$ of the cylinder body 41 in a fluid-tight, axially slidable condition, thereby defining, together with the small-diameter portion, a pressure chamber Ro into which the port 41$a$ opens; a large-diameter piston 43, which is provided in a large-diameter portion of the stepped bore 41$b$ of the cylinder body 41 in an axially slidable condition; a compression coil spring S3 having a setting load of about zero and intervening between the small-diameter piston 42 and the large-diameter piston 43; and a compression coil spring S4 having a setting load of about zero and intervening between the large-diameter piston 43 and the cylinder body 41.

The small-diameter piston 42 has an axial sliding resistance $r3$. Fluid pressure in the second pressure chamber R2 presses and causes the small-diameter piston 42 to move against the spring force of the compression coil spring S3, which intervenes between the small-diameter piston 42 and the large-diameter piston 43. The large-diameter piston 43 has an axial sliding resistance of about zero. The spring force of the compression coil spring S3, which intervenes between the small-diameter piston 42 and the large-diameter piston 43, or the small-diameter piston 42 causes the large-diameter piston 43 to move against the spring force of the compression coil spring S4, which intervenes between the large-diameter piston 43 and the cylinder body 41. Notably, the chambers accommodating the compression coil springs S3 and S4, respectively, are in communication with the atmosphere.

In the present embodiment, the above-described stroke simulator mechanism functions for establishing the following operation: an idle stroke (No. 2 idle) of the floating piston 13 starts and ends in the midst of an idle stroke (No. 1 idle) of the rod piston 12, and the small-diameter piston 42 of the simulator cylinder 40 starts its stroke after completion of an idle stroke (No. 2 idle) of the floating piston 13 and before completion of the idle stroke (No. 1 idle) of the rod piston 12, thereby ensuring a stroke of the brake pedal 52. Spring constants K1, K2, K3, and K4 of the compression coil springs S1, S2, S3, and S4, respectively, are set so as to satisfy the relationship K4>K1>K2>K3.

In the thus-configured embodiment, when the brake pedal 52 is stepped on, the electric control unit (not shown) brings both separation valves V1 and V2 into the shutoff condition and the on-off valve V3 into the communication condition; the compression coil springs S1, S2, S3, and S4 contract sequentially in accordance with an input load that is imposed on the pedal rod 51 from the brake pedal 52; and the pistons 12, 13, 42, and 43 perform respective strokes. Accordingly, the pedal rod 51 performs an axial stroke. Thus, as shown in FIG. 3, the stroke of the pedal rod 51 (rod stroke) increases with the input load that is imposed on the pedal rod 51 from the brake pedal 52.

Point A of FIG. 3 is the time when the input load reaches the sum (f1+r1) of the setting load f1 of the compression coil spring S1 and the sliding resistance r1 of the rod piston 12 and when the rod piston 12 in the basic position of FIG. 1 begins to move against the compression coil spring S1 and thus begins to contract the compression coil spring S1; i.e., the time when the idle stroke (No. 1 idle) of the rod piston 12 starts.

Point B of FIG. 3 is the time when the input load reaches the sum (f2+r2) of the setting load f2 of the compression coil spring S2 and the sliding resistance r2 of the floating piston 13 and when the floating piston 13 in the basic position of FIG. 1 begins to move against the compression coil spring S2 and thus begins to contract the compression coil spring S2; i.e., the time when the idle stroke (No. 2 idle) of the floating piston 13 starts. In the period of time between point A and point B of FIG. 3, only the rod piston 12 performs a stroke, so that the gradient of segment AB is substantially equal to the spring constant of the compression coil spring S1.

Point C of FIG. 3 is the time when the idle stroke (No. 2 idle) of the floating piston 13 becomes substantially 1 mm, and thus the plunger valve 13$a$ is closed; i.e., the time when fluid pressure in the second pressure chamber R2 begins to increase and when the idle stroke (No. 2 idle) of the floating piston 13 ends. In the period of time between point B and point C of FIG. 3, the rod piston 12 and the floating piston 13 perform respective strokes, so that the gradient of segment BC is substantially equal to the combined spring constant of the compression coil springs S1 and S2.

Point D of FIG. 3 is the time when fluid pressure in the second pressure chamber R2; i.e., fluid pressure in the pressure chamber Ro of the simulator cylinder 40, reaches the sliding resistance r3 of the small-diameter piston 42 and when the small-diameter piston 42 in the basic position of FIG. 1 begins to move against the compression coil spring S3 and thus begins to contract the compression coil spring S3. In the period of time between point C and point D of FIG. 3, while the rod piston 12 performs a stroke, the floating piston 13 and the small-diameter piston 42 do not perform respective strokes, so that a section ranging from the second pressure chamber R2 to the pressure chamber Ro becomes a rigid body. Thus, the gradient of segment CD becomes substantially equal to the spring constant of the compression coil spring S1.

Point E of FIG. 3 is the time when the idle stroke (No. 1 idle) of the rod piston becomes substantially 6 mm, and thus the plunger valve 12$a$ is closed; i.e., the time when fluid pressure in the first pressure chamber R1 begins to increase and when the idle stroke (No. 1 idle) of the rod piston 12 ends. In the period of time between point D and point E of FIG. 3, the rod piston 12, the floating piston 13, the small-diameter piston 42, and the large-diameter piston 43 perform respective strokes, so that the gradient of segment DE is substantially equal to the combined spring constant of the compression coil springs S1, S2, S3, and S4.

Point F of FIG. 3 is the time when the small-diameter piston 42 abuts the large-diameter piston 43. In the period of time between point E and point F of FIG. 3, while the rod piston 12, the floating piston 13, the small-diameter piston 42, and the large-diameter piston 43 perform respective strokes, the compression coil spring S1 does not contract, so that the gradient of segment EF becomes substantially equal to the combined spring constant of the compression coil springs S2, S3, and S4.

Point G of FIG. 3 is the time when the large-diameter piston 43 abuts the cylinder body 41 while the small-diameter piston 42 is in contact with the large-diameter piston 43 and when the function of the stroke simulator mechanism (the function of ensuring a stroke of the brake pedal 52) ends. In the period of time between point F and point G of FIG. 3, while the rod piston 12, the floating piston 13, the small-diameter piston 42, and the large-diameter piston 43 perform respective strokes, the compression coil spring S1 does not contract, and the small-diameter piston 42 and the large-diameter piston 43 in contact with each other perform a stroke, so that the gradient of segment FG becomes substantially equal to the combined spring constant of the compression coil springs S2 and S4.

As is apparent from the above description, in the present embodiment, since the idle stroke (No. 2 idle) of the floating piston 13 starts in the midst of the idle stroke (No. 1 idle) of the rod piston 12, while the rod piston 12 is performing a stroke, the floating piston 13 starts its stroke. Thus, when stepping-on the brake pedal 52 causes the stroke simulator mechanism to operate, shock associated with start of movement of the floating piston 13 can be reduced, thereby improving an operator's feeling of operating the brake pedal 52.

Also, in the present embodiment, the small-diameter piston 42 of the simulator cylinder 40 starts its stroke after completion of the idle stroke (No. 2 idle) of the floating piston 13 and before completion of the idle stroke (No. 1 idle) of the rod piston 12 so as to ensure a stroke of the brake pedal 52. Thus, shock associated with start of movement of the small-diameter piston 42 of the simulator cylinder 40 can be reduced, thereby improving an operator's feeling of operating the brake pedal 52.

Further, in the present embodiment, the orifices 15a and 17b are respectively provided in the passages 12c and 13c, which respectively establish communication between the first pressure chamber R1 and the first reservoir pressure chamber AR1, defined within the brake master cylinder 10 by means of the piston 12, and communication between the second pressure chamber R2 and the second reservoir pressure chamber AR2, defined within the brake master cylinder 10 by means of the piston 13. Therefore, when the rod piston 12 moves rapidly due to an abrupt operation of the brake pedal 52, the above-described orifices 15a and 17b each exhibit a throttle effect during the idle strokes of the pistons 12 and 13, so that pressure is generated in each of the pressure chambers R1 and R2, defined by the pistons 12 and 13, respectively.

The thus-generated pressure acts, as a reaction force, on the brake-operating member 52, to enhance the rigid feel, whereby the operation feeling at the time of abrupt operation of the brake-operating member 52 can be improved. In such a case, the relationship between input load and rod stroke shown in FIG. 3 changes from the relationship represented by a solid line to the relationship represented by an imaginary line, whereby the points A to G cause generally parallel translation to points a to g by a predetermined amount in the direction in which input load increases.

Moreover, in the present embodiment, the orifice 15a exhibits a throttle effect until a relative movement between the rod piston 12 and the floating piston 13 substantially ends. Therefore, a throttle effect can be obtained over the substantially entire idle stroke of the rod piston 12, whereby sufficiently high pressure is generated in the pressure chamber R1 defined by the rod piston 12.

In the above-described embodiment, the present invention is applied to a hydraulic brake apparatus whose stroke simulator mechanism includes the simulator cylinder 40 and the on-off valve V3. However, the configuration of the stroke simulator mechanism can be modified freely, and the present invention is not limited to the above-described embodiment. Also, in the above-described embodiment, the brake master cylinder 10 is of a center valve type in which the pistons 12 and 13 have the corresponding plunger valves 12a and 13a provided at the corresponding centers thereof. However, a master cylinder of another type; for example, a conventional master cylinder, may be employed.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic brake apparatus comprising:
a tandem brake master cylinder comprising:
a cylinder body;
a rod piston moving in response to a brake-operating member, the rod piston defining within the cylinder body a first reservoir pressure chamber in communication with a reservoir, and a first pressure chamber in communication with a hydraulic brake circuit connecting the tandem brake master cylinder and a brake wheel cylinder, the rod piston having a first valve adapted to establish and shut off communication between the first pressure chamber and the first reservoir pressure chamber, the rod piston being capable of an idle stroke while the first valve is in an establishing condition establishing the communication between the first pressure chamber and the first reservoir pressure chamber;
a floating piston moving in response to the rod piston, the floating piston defining within the cylinder body a second reservoir pressure chamber in communication with the reservoir and a second pressure chamber in communication with the hydraulic brake circuit, the floating piston having a second valve adapted to establish and shut off communication between the second pressure chamber and the second reservoir pressure chamber, the floating piston being capable of an idle stroke while the second valve is in an establishing condition establishing the communication between the second pressure chamber and the second reservoir pressure chamber;
a separation valve provided in the hydraulic brake circuit and adapted to establish and shut off communication between the tandem brake master cylinder and the brake wheel cylinder;
a pressure control valve unit controlling fluid pressure to be supplied from an external fluid-pressure supply source to the brake wheel cylinder while the separation valve is in a shutoff condition; and
a stroke simulator mechanism for ensuring a stroke of the brake-operating member in accordance with an input load to the brake-operating member while the separation valve is in the shutoff condition, by allowing a stroke of the rod piston and a stroke of the floating piston, the stroke simulator mechanism comprising a simulator piston which is caused to move by fluid pressure in the second pressing chamber;
wherein a first orifice is provided in a first passage which establishes, during the idle stroke of the rod piston, communication between the first pressure chamber and the first reservoir pressure chamber; and a second orifice is provided in a second passage which establishes, during the idle stroke of the floating piston, communication between the second pressure chamber and the second reservoir pressure chamber;
wherein the idle stroke of the floating piston starts and ends during the idle stroke of the rod piston, and the simulator piston starts its stroke after completion of the idle stroke of the floating piston and before or upon completion of the idle stroke of the rod piston so as to ensure the stroke of the brake-operating member.
wherein the length of the idle stroke of the rod piston is set to be longer than the length of the idle stroke of the floating piston.

* * * * *